United States Patent [19]
Ley et al.

[11] 3,779,275
[45] Dec. 18, 1973

[54] ENVIRONMENTAL AIR DISTRIBUTION CONTROL SYSTEM POWERED BY SYSTEM PRESSURE

[75] Inventors: Ralph M. Ley; Harold M. Alyea; Thomas H. Holloway, all of Waukesha, Wis.

[73] Assignee: Johnson Service Company, Milwaukee, Wis.

[22] Filed: Nov. 22, 1971

[21] Appl. No.: 201,006

[52] U.S. Cl. .............................. 137/505.18, 236/49
[51] Int. Cl. ............................................. F16k 21/14
[58] Field of Search .................. 236/49; 137/505.18

[56] References Cited
UNITED STATES PATENTS

| | | | |
|---|---|---|---|
| 3,025,873 | 3/1962 | Ray | 137/505.18 |
| 3,153,424 | 10/1964 | Acker et al. | 137/505.18 |
| 2,853,268 | 9/1958 | Hughes | 137/505.18 |
| 3,653,588 | 4/1972 | Drebelbis | 236/49 |
| 3,255,963 | 6/1966 | Gorchev et al. | 236/49 |

*Primary Examiner*—William E. Wayner
*Assistant Examiner*—William E. Tapolcai
*Attorney*—Dienner et al.

[57] ABSTRACT

An environmental air distribution control system regulates the flow of air under pressure by using the system pressure itself to effect the desired control. This is accomplished by using one or more pressure regulating valves, each pressure regulating valve being adapted to selectively vary the pressure drop across its output impedance to thereby control the rate of flow of air.

4 Claims, 6 Drawing Figures

ENVIRONMENTAL AIR DISTRIBUTION CONTROL SYSTEM POWERED BY SYSTEM PRESSURE

BACKGROUND OF THE INVENTION

This invention relates to environmental control systems that supply to a conditioned space a constant volume of heated or cooled air with respect to system variables and a variable volume with respect to space heating or cooling demands.

There are a number of prior art control systems that use system pressure changes to reposition dampers or the like to effect a change in the orifice size for adjusting the rate of flow. These prior art control systems use open loop control which are incapable of determining whether the amount of correction is adequate.

One object of this invention is to provide in an environmental control system a closed loop air distribution system that is powered from system pressure to regulate the flow rate into the conditioned space.

Another object of this invention is to provide in a pressurized environmental air distribution system a novel pressure regulating valve that controls the pressure drop across a given impedance to regulate the flow rate.

Still another object of this invention is to provide a closed loop air distribution control system that utilizes a novel pressure regulating valve to regulate the flow rate in proportion to changes in environmental temperature.

A further object of this invention is to provide an air distribution control system that uses a pressure regulating valve to regulate the flow rate of one air supply at a certain temperature in response to changes in environmental temperature, a second mechanically-set pressure regulating valve to regulate the flow rate of a second air supply at a different temperature, and a plenum chamber to mix the two air supplies and provide a constant volume to the conditioned space.

A still further object of this invention is to provide an environmental air distribution control system having a plurality of outlets that utilizes at each outlet a pressure regulating valve for adjusting the flow rate of each outlet.

SUMMARY OF THE INVENTION

This invention utilizes in an environmental air distribution system a pressure regulating valve for rate of flow control providing a closed loop control system powered from system pressure. In one embodiment the pressure regulating valve maintains constant volume with respect to system variables, but operates in direct response to changes in ambient temperature for regulating the rate of flow in proportion to changes in the environmental sensed temperature. The pressure regulating valve is of the double orifice balanced type with the size of the two orifices selected with respect to each other to avoid actuation due to Bernoulli's effect.

A second embodiment is concerned with a double duct constant volume control in which the air in two ducts are at different temperatures and are mixed together in a plenum chamber. One pressure regulating valve varies the rate of flow in one of the ducts in response to changes in sensed temperature, and the rate of flow through the other duct is determined by the mechanical setting on the second pressure regulating valve.

A third embodiment of this invention is used to adjust the flow rate in each outlet branch of a multiple outlet system. To this end, a mechanically adjustable pressure regulating valve is installed in each outlet branch to provide easy balancing of the distribution system.

DESCRIPTION OF THE DRAWINGS

For a better understanding of this invention, reference may be made to the accompanying drawings, in which.

FIRST EMBODIMENT

Figure 1:
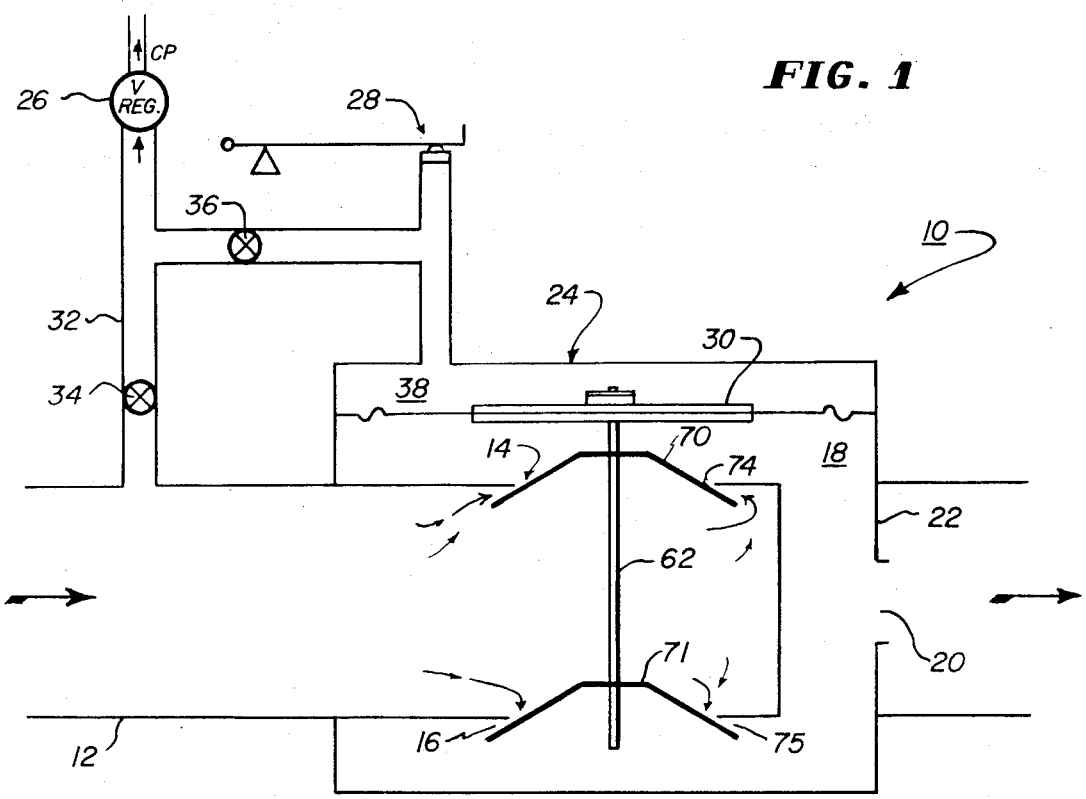
FIG. 1 is a schematic diagram of the first embodiment of this invention.

Referring to FIG. 1 there is shown a schematic diagram of an environmental control system embodying the principles of this invention and generally designated by the reference numeral 10. The system air under pressure enters duct 12 from the left, passes through ports 14 and 16 into chamber 18 and exits from chamber 18 through orifice 20 in orifice plate 22.

The rate of flow of air in the system is controlled by a novel pressure regulating system generally designated by the reference numeral 24 and whose active components are a pressure relief valve 26, a pneumatic thermostat 28 and a diaphragm-actuated valve 30. The pressure regulating valve 24 is designed to maintain a constant pressure in chamber 18. By maintaining a constant pressure in chamber 18, the flow through orifice 20 is controlled by the following relation:

$$Q = K A \quad 2DP/M \quad \text{(Equation 1)}$$

where:
K is the orifice coefficient
A is the area of the orifice
DP is the pressure drop from chamber 18 to ambient
M is the mass density of air
Q is the flow rate At the input to pressure regulating valve 24, a bypass conduit 32 directs a small portion of the input air to pressure relief valve 26 and pneumatic thermostat 28. Orifices 34 and 36, respectively, are set to restrict the air delivered to pressure relief valve 26 and pneumatic thermostat 28.

The function of the pressure relief valve 26 is to provide a constant pressure to orifice 36 of thermostat 28 from the variable input supplied into bypass conduit 32 and could be, for example, a pop valve that uses the weight of a ball to bleed off a portion of the air introduced into conduit 32 to maintain a constant pressure in the conduit regardless of variations in supply pressure. This maintains a constant air pressure to orifice 36 of the thermostat 28.

Figure 2:
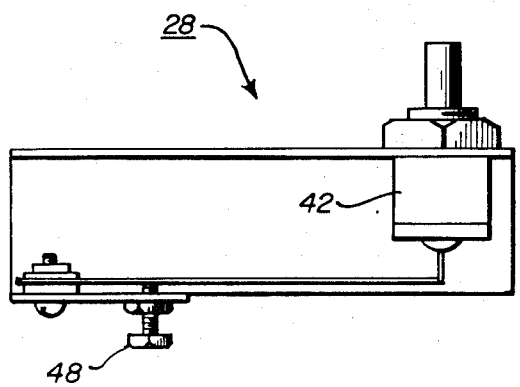
FIG. 2 is a front elevational view of a thermostatic device used in the first embodiment.
Figure 3:
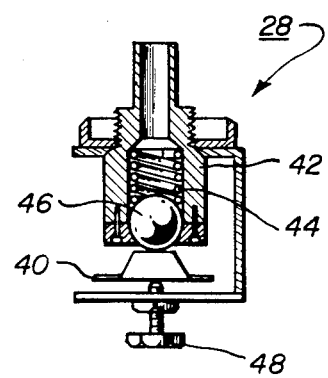
FIG. 3 is an end view of FIG. 2.

Thermostat 28 controls the pressure in chamber 38 in direct proportion to the sensed environmental temperature. A suitable thermostat for this purpose is depicted in FIGS. 2 and 3. Thermostat 28 comprises a bimetal element 40 which adjusts the setting of a ball-operated valve 42. The ball-operated valve 42 is spring loaded by spring 44 to hold the ball 46 in the normally closed position. The bimetal element 40 can be adjusted by set point screw 48 and is disposed to always touch ball 46. Bimetal element 40 moves in response to changes in temperature to displace the ball 46 and modulates the flow of air to the atmosphere to adjust the pressure of chamber 38 in direct proportion to changes in the temperature.

The relative pressures in chambers 38 and 18 determine the position of the diaphragm-operated valve 30 and thereby control the size of the openings at ports 14 and 16. Once a pressure in chamber 38 is set by pneumatic thermostat 28, the pressure regulating valve 24 will maintain a corresponding constant pressure in chamber 18. The thermostat can reset this pressure up to the upper pressure limit set on the pressure relief valve 26.

Figure 4:
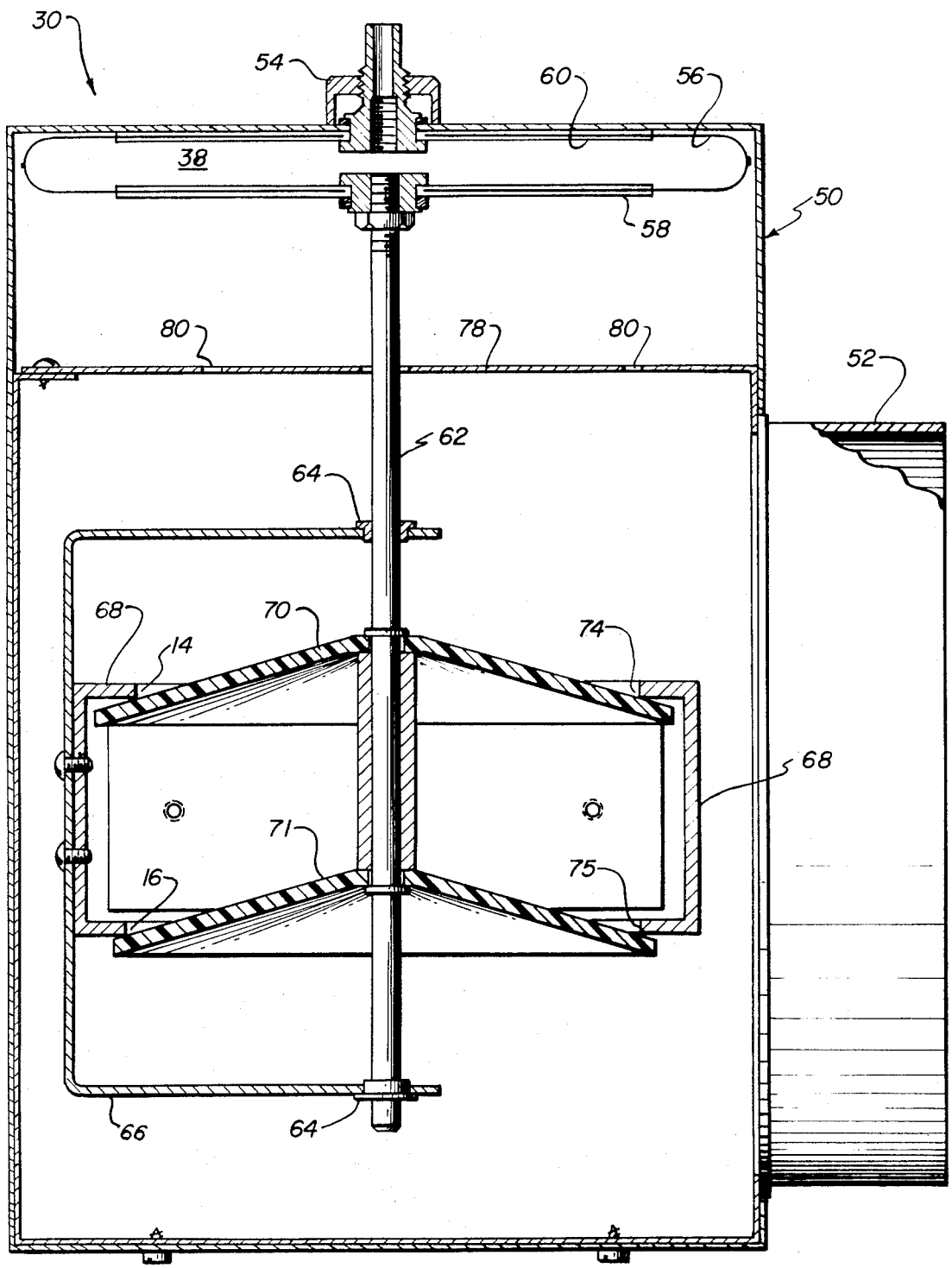
FIG. 4 is a sectional view of a diaphragm-actuated valve used in the first embodiment.

One example of a diaphragm-operated valve 30 is depicted in FIG. 4, which is contained within an enclosed housing 50 having an outlet collar 52 and an identical inlet collar (not shown). A fitting 54 is provided for connection to the thermostat 28 of FIG. 1. Chamber 38 is formed for convenience by a flexible diaphragm envelope 56 whose opposite flattened sides are stiffened by plates 58 and 60. One end of a perpendicularly-disposed push rod 62 is staked at the center of plate 58, and fitting 54 is staked at the center of plate 60.

Push rod 62 is slidingly supported in a pair of spaced bearings 64 that are mounted in openings formed at the ends of the arms of a U-shaped frame 66. Frame 66 is supported by the inlet tubing 68 adjacent its closed end. A pair of valve members (that may be cone shaped) 70, 71 in the form of convex discs are fixed in place on push rod 62 and separated by a cylindrical spacer 72, and these discs 70, 71 cooperate, respectively, with a pair of openings 74, 75 formed in opposite sides of inlet tubing 68 to provide ports 14 and 16 of FIG. 1. A baffle plate 78 with holes 80 formed therein is mounted below diaphragm 56 preventing system air flowing into the valve inlet from directly striking diaphragm 56 to insure that the diaphragm senses only static pressure and not system pressure.

It is necessary to make opening 75 slightly larger in diameter than opening 74 so that the static pressure acting at port 16 would tend to balance the Bernoulli's effect on the valve system. This avoids the tendency for the valve to close itself, when it apraches nearly closed position. Valve disc 71 should also be made smaller in overall diameter to reduce the area upon which the air velocity impinges when in the wide open position.

SECOND EMBODIMENT

Figure 5:
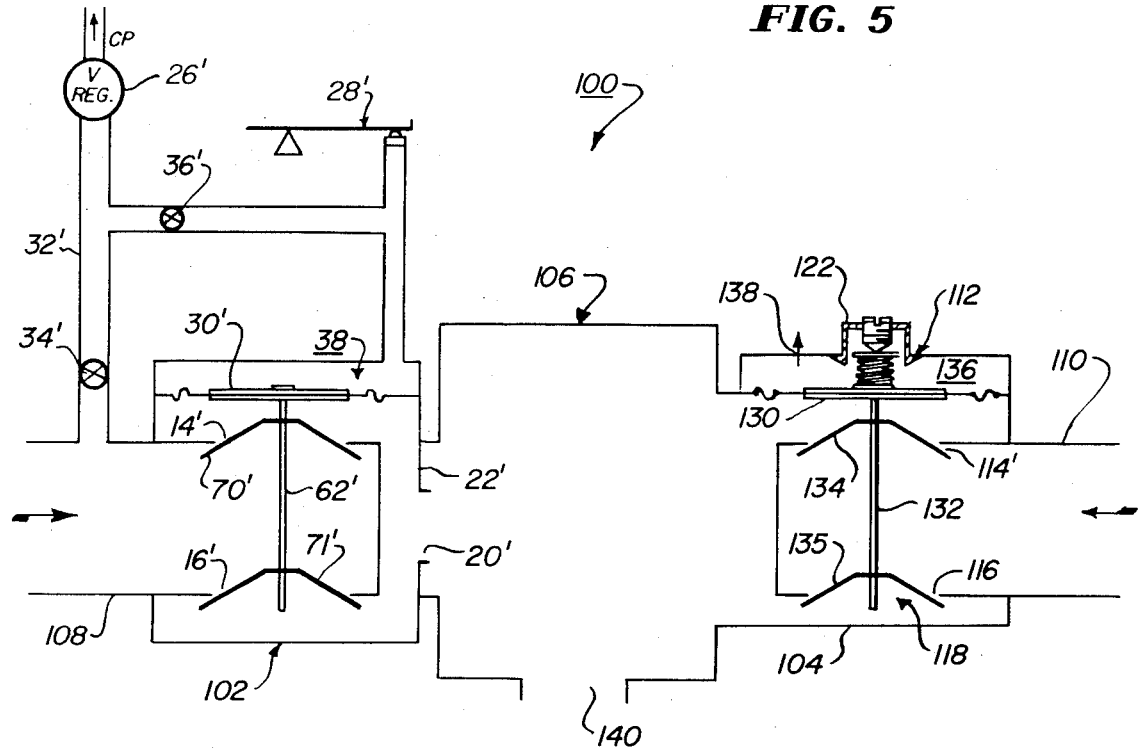
FIG. 5 is a schematic diagram of the second embodiment of the invention.

The second embodiment is directed to an environmental control system schematically shown in FIG. 5 and designated by the reference numeral 100. Control system 100 is used for double duct constant volume control and comprises a pair of pressure regulating valves 102 and 104 and a plenum chamber 106 with a predetermined outlet orifice 140.

Pressure regulating valve 102 is identical to the pressure regulating valve 24 of the first embodiment and operates to control the flow of air from hot duct 108. Like parts of pressure regulating valve 102 to those of previously described pressure regulating valve 24 will be indicated by prime numbers.

Pressure regulating valve 104 is a mechanical set point unit that controls the flow of air from cold duct 110 and employs a diaphragm-operated valve 112 to selectively vary the opening of ports 114 and 116 to maintain a predetermined pressure in chamber 118 which opens unrestricted into plenum 106. The flow from chamber 118 and plenum 106 through exit orifice 140 is controlled by the relation defined by Equation 1, where the constant pressure of chamber 118 is mechanically set. Diaphragm-operated valve 112 differs from diaphragm-operated valve 30 in that the fitting 54 is replaced by an adjustable spring device 122. Set screw 124 can be turned to vary the spring force of range spring 126 for adjusting the initial pressure setting for chamber 118.

Diaphragm-operated valve 112 includes a flexible diaphragm 130, push rod 132 and a pair of valve members 134, 135 which are identical, respectively, to flexible diaphragm 30, push rod 62 and valve members 70, 71 of the first embodiment. The upper chamber 136 is closed except for a small air escape aperture 138 leading to the atmosphere.

The environmental control system of FIG. 5 is made up of two single duct systems connected in parallel with one supplying cooler air than the other. Space temperature control is then achieved by mixing the two air supplies in any proportions necessary to satisfy the local requirements. Pressure regulating valve 102 is controlled by thermostat 28' and is designed to maintain in full heating demand the given pressure in the plenum chamber 106 to control the flow through the exit orifice 140. Thus, in a full heating demand condition sufficient pressure exists in chamber 118 to overcome the force of spring 126 and cause the cold duct pressure regulating valve 112 to close off. When the thermostat 28' is not calling for full heating, the mechanical pressure regulating valve 112 supplies the additional quantity of air necessary to maintain the pressure in plenum 106. Likewise, the mechanical pressure regulating valve 112 is capable of maintaining the pressure in plenum 106 when the thermostat 28' is calling for no heat and the hot duct unit is closed.

The control system of the second embodiment is obviously more expensive than that of the first embodiment. However, it fulfills the objectives of being a true constant volume system which can cope with wider load variations than is possible with the single duct system of FIG. 1.

THIRD EMBODIMENT

This embodiment is directed to a control apparatus for providing system balancing in a central air distribution system having a plurality of outlet branches from a main duct. The principle employed is to provide a pressure regulating valve in each outlet branch to maintain a relatively constant pressure on its outlet side. Balancing is accomplished by adjusting for each valve the spring force acting on its diaphragm to obtain the desired flow rate at its corresponding outlet.

Figure 6:
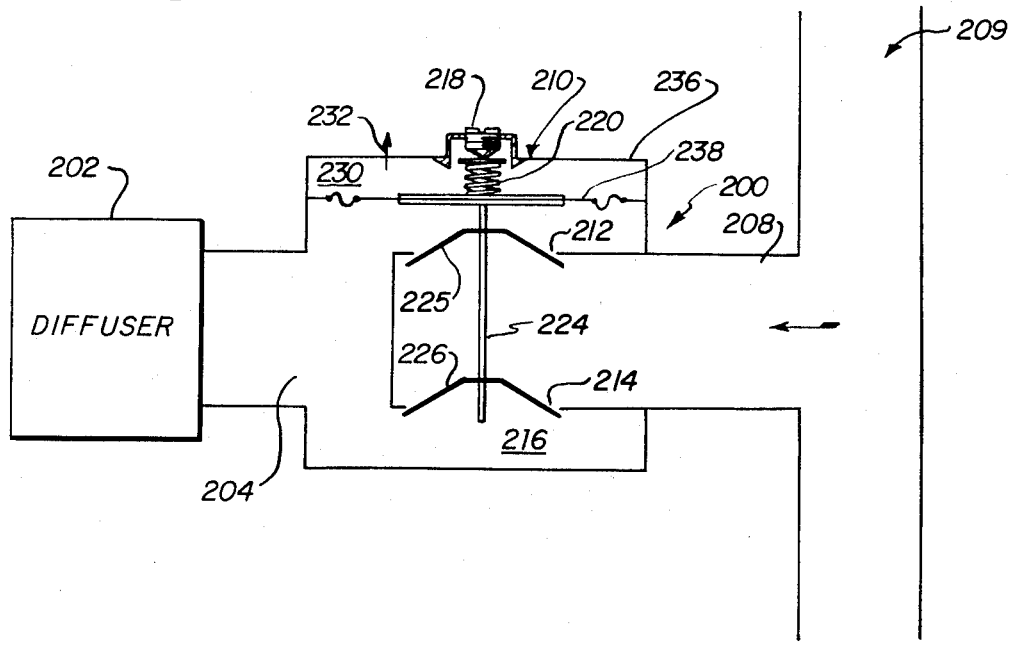
FIG. 6 is a schematic diagram of the third embodiment of the invention.

Referring to FIG. 6, there is shown one of a plurality of outlet branches 208 coming from a single air duct 209. The pressure regulating valve 200 is placed in the line before the diffuser 202. The purpose of pressure regulating valve 200 is to maintain a relatively constant pressure at its outlet 204, which is also the inlet to the diffuser 202 or like device.

Pressure regulating valve 200 is a mechanically set point unit that controls the flow of air in the outlet duct 208 and employs a diaphragm-operated valve 210 to selectively vary the opening of ports 212 and 214 to determine the quantity of air flowing through duct 208 into chamber 216. The flow from chamber 216 through exit orifice 204 is controlled by the relation defined by Equation 1, where the constant pressure of chamber 216 is mechanically set.

Diaphragm-operated valve 210 is identical in construction to diaphragm-operated valve 112 of FIG. 5. Set screw 218 can be turned to vary the spring force of range spring 220 for presetting the pressure in chamber 216.

Diaphragm-operated valve 210 includes a flexible diaphragm 222, push rod 224 and a pair of valve members 225, 226 which are identical, respectively, to flexible diaphragm 130, push rod 132 and valve members 134, 135 in FIG. 5. The upper chamber 230 is closed except for a small air escape aperture 232 leading to the atmosphere.

Range spring 220 is disposed between the upper surface 238 of diaphragm 222 and upper housing wall 238. In the upper wall 236, a threaded socket 240 is mounted for adjusting the spring force of spring 220 by turning set screw 218. Alternately, the setting of valve 210 may be effected by using weights (not shown) acting on diaphragm 222 instead of spring 220.

Since the pressure at the diffuser 202 discharged into the surrounding space is atmospheric, the pressure drop across the diffuser is equal to the pressure at the diffuser inlet, i.e., the discharge pressure of pressure regulating valve 200. Thus, the flow rate at each outlet is determined by the setting of the pressure regulating valve discharge pressure. Because each diffuser has a known discharge volume for every value of pressure, all that is required to achieve system balance is to set the spring adjustment by turning screw 218 to the desired value for each outlet. Due to the ability of pressure regulating valve 200 to correct for variations in system pressures, only one operation at each diffuser outlet is required to obtain optimum system balance, instead of the trial and error multiple readjustments of each diffuser needed in prior art balancing systems.

It will be apparent that modifications and variations may be made in each of the three embodiments without departing from the scope of the novel concepts of the present invention. It is accordingly our intention that the scope of the invention be limited solely by that of the hereinafter appended claims.

The claims:

We claim as our invention the following:

1. In an environmental control system distributing air under pressure and including a distribution duct, a pressure regulating valve having a housing, a flexible diaphragm separating said housing into upper and lower pressure chambers, said housing having an outlet opening from said lower chamber, said housing having an inlet opening connecting said lower pressure chamber to said distribution duct for receiving air under pressure therein, said inlet opening including first and second circular openings in axial alignment with each other, the diameter of said second opening being slightly larger than said first opening, valve means disposed in said inlet opening for controlling the flow of air from said distribution duct into said pressure chamber, said valve means including first and second cone shaped valve members disposed respectively within said first and second circular openings, said second cone shaped valve member being slightly smaller in diameter than said first valve member, such that air entering said inlet urges said first valve member towards closing said first opening while urging said second valve member towards opening said second opening, said valve means including a push rod interconnecting said valve members and said flexible diaphragm for movement therewith, and means for selectively presetting the position of said diaphragm and thus its attached valve means with respect to said inlet opening for response to the differential pressure acting on said diaphragm from said upper and lower pressure chambers for maintaining a predetermined flow rate of air from said lower pressure chamber through said outlet.

2. The arrangement set forth in claim 1 wherein said means for selectively presetting the position of said diaphragm comprises means for exerting a force on said diaphragm against the pressure in said lower chamber exerted on said diaphragm.

3. The arrangement set forth in claim 2 wherein said means for exerting a force upon said diaphragm in opposition to the pressure acting thereon from said lower chamber comprises a range spring and means for adjusting the force of said spring acting on said diaphragm.

4. A pressure regulating valve as defined in claim 1 wherein a baffle having holes formed therein is disposed in said lower chamber between said diaphragm and said inlet for preventing direct impingement of incoming air on said diaphragm.

* * * * *

PO-1050
(5/69)

UNITED STATES PATENT OFFICE
CERTIFICATE OF CORRECTION

Patent No. 3,779,275          Dated December 18, 1973

Inventor(s) Ralph M. Ley, Harold W. Alyea and Thomas M. Holloway

It is certified that error appears in the above-identified patent and that said Letters Patent are hereby corrected as shown below:

After the title, correct the inventors' names as follows:

Inventors: Ralph M. Ley; Harold W. Alyea;
Thomas M. Holloway, all of
Waukesha, Wis.

Signed and sealed this 4th day of June 1974.

(SEAL)
Attest:

EDWARD M. FLETCHER, JR.
Attesting Officer

C. MARSHALL DANN
Commissioner of Patents